United States Patent Office 3,403,191
Patented Sept. 24, 1968

3,403,191
CONVERSION OF TETRAFLUOROETHYLENE TO LIQUID FLUOROCARBONS
Donald P. Graham, Wilmington, Del., assignor to E. I. du Pont de Nemours and Company, Wilmington, Del., a corporation of Delaware
No Drawing. Filed Sept. 1, 1964, Ser. No. 393,767
9 Claims. (Cl. 260—653.1)

ABSTRACT OF THE DISCLOSURE

Preparation of fluorinated products having at least eight carbon atoms by contacting tetrafluoroethylene with cesium fluoride suspended in a solvent having the structure $RO(C_pH_{2p}O)_nR$, wherein R is a $C_1$ to $C_4$ alkyl group, $p$ is an integer from two to four and $n$ is an integer from one to four. The liquid perfluorocarbons so produced are useful as intermediates, solvents, fluids in systems requiring inert and stable liquids, etc.

This invention is directed to a process for converting tetrafluoroethylene to polymeric products.

Liquid fluorocarbons containing eight or more carbon atoms are difficult and expensive to manufacture. Such liquids are useful as intermediates, solvents, and as fluids for use in gyroscopes and similar systems where highly inert and stable liquids are required.

It is, therefore, an object of this invention to provide a novel and inexpensive process for preparing liquid perfluorocarbons containing eight or more carbon atoms.

It is another object of the present invention to prepare novel perfluorocarbon products containing eight or more carbon atoms.

More specifically, the present invention is directed to a process for polymerizing tetrafluoroethylene which comprises contacting tetrafluoroethylene with cesium fluoride suspended in a solvent having the structure $$RO(C_pH_{2p}O)_nR$$

wherein R is a $C_1$ to $C_4$ alkyl group, $p$ is an integer from two to four and $n$ is an integer from one to four. The polymerization reaction is carried out at a pressure up to 225 p.s.i.a. and at a temperature above 0° C. After completion of the reaction, novel fluorinated products containing at least eight carbon atoms are recovered from the reaction mixture.

In the present polymerization process of tetrafluoroethylene two types of products are formed. The predominant products are acyclic fluorocarbons characterized by the emperical formula $C_{2x}F_{4x}$ wherein $x$ represents the number of tetrafluoroethylene molecules contained in the product. The acyclic fluorocarbon products formed by this process may contain anywhere from four to fifteen tetrafluoroethylene molecules and therefore range from $C_8F_{16}$ to $C_{30}F_{60}$. The minor products are adducts formed from the reaction of tetrafluoroethylene with the polyether solvent. These adducts are characterized by the emperical formulae $RO(C_pH_{2p}O)_nR \cdot (C_2F_4)_y$ wherein $y$ is from one to three.

The predominant products $C_{2x}F_{4x}$ are unsaturated, containing a single carbon-carbon double bond. As indicated by the infrared and nuclear magnetic resonance spectra, these products are generaly perfluoro derivatives of tri- or tetrasubstituted ethylenes, i.e., $R^1{}_fR^2{}_fC\!=\!CFR^3{}_f$ or $R^1{}_fR^2{}_fC\!=\!CR^3{}_fR^4{}_f$, where $R^1{}_f$ to $R^4{}_f$ represent perfluoroalkyl groups. A number of isomers are obtainable for each value of $x$ in the emperical formula. The number of isomers possible depends on the nature of the perfluoroalkyl groups combined in the product. These olefines are generally inert, the double bond being unreactive toward reagents which usually attack ordinary aliphatic carbon-carbon double bonds.

The adduct products $RO(C_pH_{2p}O)_nR \cdot (C_2F_4)_y$ appear from their infrared and nuclear magnetic resonance spectra to be reaction products wherein fluorine containing groups are substituted on the carbons of the polyether molecules. When $y$ in the formula has a value greater than one, the analyses of the spectra or other properties of the compound do not provide sufficient information to determine whether the $C_2F_4$ substituents consist of several fluorinated groups of two carbons attached to different carbon atoms in the polyether or one group of four or more carbons attached to one carbon atom in the polyether.

The present process can be carried out continuously or on a batch scale. This process is carried out by passing tetrafluoroethylene into a reaction vessel containing cesium fluoride suspended in the polyether solvent. The solvent mixture is preferably agitated during reaction to accomplish intimate contact of the reactants. Any temperature above 0° C. can be used for the reaction. There does not appear to be a defined limit above which the reaction will not take place between 0° C. and the critical point of the polyether solvents. A practical upper temperature limit for the reaction is about 200° C. Reaction temperatures between 70° and 125° C. are most useful and 100° C. is preferred. Reaction pressures of 7 p.s.i.a. to 225 p.s.i.a. are useful, with pressures of from 25–40 p.s.i.a. being preferred under most conditions. Tetrafluoroethylene is added until the reaction ceases. Cessation of the reaction is easily recognized. The reaction of tetrafluoroethylene is accompanied by a pressure decrease in the reaction system. Termination of the reaction is indicated, therefore, by the lack of a pressure decrease in the reaction vessel after the addition of new tetrafluoroethylene. In general, it is preferable to add tetrafluoroethylene in increments rather than the entire amount initially, since gradual addition allows better control of the reaction and obviates the necessity of using high pressure equipment. Since the reactants and products are noncorrosive there are no limitations on the materials of construction of the reaction vessel other than those of withstanding the temperatures and pressures utilized in the process. It has been found that water interferes with the reaction; and, therefore, it is preferable to use reasonably anhydrous conditions.

Fluorides other than cesium fluoride and solvents other than the defined polyethers are not useful in the present process. Potassium fluoride and sodium fluoride are of no value in the present process.

The polyethers utilized in the present process are defined by the formula $RO(C_pH_{2p}O)_nR$ wherein R is a lower alkyl group of one to four carbons, i.e., methyl, ethyl, propyl or butyl, $p$ is an integer from two to four, and $n$ is an integer from one to four. Specific examples of solvents within this definition and utilized in the present process are $CH_3OCH_2CH_2OCH_3$
$CH_3O(CH_2CH_2O)_2CH_3$
$CH_3O(CH_2CH_2O)_3CH_3$
$CH_3O(CH_2CH_2O)_4CH_3$
$C_2H_5O(CH_2CH_2O)_2C_2H_5$
$C_2H_5O(CH_2CH_2O)_4C_2H_5$
$C_4H_9O(CH_2CH_2O)_3C_4H_9$
$C_3H_7O(CH_2CH_2O)_2C_3H_7$
$CH_3O(C_3H_6O)_3CH_3$
$CH_3O(C_3H_6O)_4CH_3$
$CH_3O(CH_2)_4OCH_3$
$CH_3O[(CH_2)_4O]_2CH_3$, and
$CH_3O[(CH_2)_4O]_4CH_3$.

Of these, $CH_3O(CH_2CH_2O)_2CH_3$
$CH_3O(CH_2CH_2O)_3CH_3$, and
$CH_3O(CH_2CH_2O)_4CH_3$ are preferred. Most of the polyethers defined within the scope of the formula $RO(C_pH_{2p}O)_nR$ are commercially available or readily prepared from the commercially available glycols of the formula $HO(C_pH_{2p}O)_nH$, wherein $p$ and $n$ are the same as above.

Representative examples illustrating the present invention follow. All parts are by weight unless otherwise specified.

Example 1

Dry cesium fluoride in an amount of 10 parts was slurried under dry conditions in 140 parts of diethyleneglycol dimethyl ether in a stirred pressure bottle. The atmosphere in the bottle was replaced with tetrafluoroethylene at 5 p.s.i.g. The reaction mass was then heated at 98–100° C. and a total of 45 parts tetrafluoroethylene was added in increments at 10–20 p.s.i.g. over a period of 80 hours. The reaction mass separated into two layers. After the layers were recovered from each other, the lower fluorocarbon layer, which measured 27 parts, was fractionally distilled into a series of branched perfluoroolefines distributed as follows:

| Compound | Boiling point, ° C./mm. Hg. | Weight percent | Number of isomers measured by vapor phase chromatography |
| --- | --- | --- | --- |
| $C_8F_{16}$ | 50/100 | 11 | 2 |
| $C_{10}F_{20}$ | 75/140 | 58 | 3 |
| $C_{12}F_{24}$ | 45–55/8 | 12 | 4 |
| $C_{14}F_{28}$ | 60–70/4 | 14 | 4 |
| Residue | | 5 | |

Evaporation of the solvent from the upper layer gave a 24% yield of a fluorinated polyether containing 38% fluorine and having a molecular weight of 370. The fluorinated polyether obtained from four reactions similar to the one described above was treated with water to remove non-fluorinated material. The water immiscible material which was left amounted to 18 parts and consisted on distillation of 10 parts polyether (B.P. 53–70° C./3 mm.) containing 34% fluorine (one $C_2F_4$ required 32.5% fluorine) and 8 parts of polyether containing 50.6% fluorine (three $C_2F_4$ required 52.5% fluorine) as a residue.

Example 2

A sealed reaction apparatus was assembled consisting of a stirred reaction pot, a reflux condenser, and a side arm which collected the reflux, retained the heavier fluorocarbon layer, and returned the excess lighter solvent to the reaction pot. Cesium fluoride, in an amount of 1.5 parts, was placed in the pot under dry conditions. Then diethyleneglycol dimethyl ether was added (28 parts to the side arm and 19 parts to the pot). The atmosphere was replaced with tetrafluoroethylene at 5 p.s.i.g. The reaction mass was heated to 100° C. with agitation and 71.5 parts of tetrafluoroethylene were added at 10–20 p.s.i.g. in increments until the reaction ceased. The fluorocarbon layer which collected in the side arm measured 58.2 parts. The fluorocarbon layer was separated from the remaining solvent, fractionally distilled and found to have the following composition:

| Compound | Boiling point, ° C./mm. Hg. | Weight percent | Number of isomers measured by vapor phase chromatography |
| --- | --- | --- | --- |
| $C_8F_{16}$ | 42/90 | 3 | 2 |
| $C_{10}F_{20}$ | 53/70–46/25 | 42 | 3 |
| $C_{12}F_{24}$ | 57/11 | 15 | 4 |
| $C_{14}F_{28}$ | 48/1 | 39.5 | 4 |
| Residue | | 0.5 | |

Thirty-five parts of the reaction solvent was fractionally distilled giving about one part of adduct with tetrafluoroethylene containing 29.6% fluorine and 7 parts of residue containing 46.8% fluorine. The molecular weight of the residue was 620.

Example 3

The procedure in Example 1 was repeated using as a reaction mixture 10 parts cesium fluoride and 150 parts triethyleneglycol dimethyl ether at 100° C. Fifty-three parts of tetrafluoroethylene were added in increments over a period of 116 hours at pressures up to 20 p.s.i.g. After the reaction ceased, the reaction mass was thereafter separated into two layers. The heavier fluorocarbon layer, in an amount of 34 parts, was fractionally distilled and found to have the following composition:

| Compound | Boiling point, ° C./mm. Hg. | Weight percent | Number of isomers measured by vapor phase chromatography |
| --- | --- | --- | --- |
| $C_8F_{16}$ | | 3 | 2 |
| $C_{10}F_{20}$ | 40/115 | 65 | 3 |
| $C_{12}F_{24}$ | 48/18 | 21 | 4 |
| $C_{14}F_{28}$ | | 2 | 4 |
| Residue | | 9 | |

Evaporation of the solvent layer gave 22 parts of tetrafluoroethylene adduct of triethyleneglycol dimethyl ether containing 32.4% fluorine. The molecular weight of the adduct was 365.

Example 4

The procedure of Example 2 was repeated using 2 parts cesium fluoride in the reaction pot. Twenty-eight parts of triethyleneglycol dimethyl ether were added to the side arm of the vessels and 24 parts to the reaction pot. The atmosphere in the reaction vessel was replaced with tetrafluoroethylene at 5 p.s.i.g., and the reaction mass heated to 100° C. Approximately 90 parts tetrafluoroethylene were added to the mass in increments at 10–20 p.s.i.g. until the reaction ceased. A total of 70 parts of fluorocarbon product were collected which fractional distillation showed to have the following composition:

| Compound | Boiling point, ° C./mm. Hg. | Weight percent | Number of isomers measured by vapor phase chromatography |
| --- | --- | --- | --- |
| $C_8F_{16}$ | 15/12 | 7 | 2 |
| $C_{10}F_{20}$ | 20/7 | 63 | 3 |
| $C_{12}F_{24}$ | 20/0.5 | 12 | 4 |
| $C_{14}F_{28}$ | 33/0.4 | 12 | 4 |
| Residue | | 6 | |

Fractional distillation of the solvent gave 2.4 parts of an adduct of triethyleneglycol dimethyl ether with tetrafluoroethylene containing 23.7% fluorine and having a molecular weight of 275, and 8 parts of an adduct containing 39.6% fluorine.

Example 5

The procedure of Example 1 was repeated using as a reaction mixture 10 parts cesium fluoride and 150 parts tetraethyleneglycol dimethyl ether at 100° C. Forty-two parts of tetrafluoroethylene were added in increments over a 50 hour period at 10–20 p.s.i.g. After the reaction was completed, the heavier fluorocarbon layer was separated from the solvent layer. Upon fractional distillation of the fluorocarbon layer, the material was found to have the following composition:

| Compound | Boiling point, ° C./mm. Hg. | Weight percent | Number of isomers measured by vapor phase chromatography |
| --- | --- | --- | --- |
| $C_8F_{16}$ | 15/12 | 6 | 2 |
| $C_{10}F_{20}$ | 20/6–2 | 80 | 3 |
| $C_{12}F_{24}$ | 20/2–28/0.5 | 12 | 4 |
| $C_{14}F_{28}$ | 33/0.4 | 0.4 | 4 |
| Residue | | 1.5 | |

The reaction solvent was washed with water, leaving 6 parts of an adduct of tetraethyleneglycol dimethyl ether with tetrafluoroethylene containing 37.4% fluorine. The adduct had a molecular weight of 590. The adduct could not be distilled without decomposition.

Example 6

The procedure of Example 2 was repeated using 1.5 parts cesium fluoride in the pot and 30 parts tetraethyleneglycol dimethyl ether in the side arm of the reaction vessel and 20 parts in the reaction pot. After replacing the atmosphere in the vessel with tetrafluoroethylene at 5 p.s.i.g. and heating the reaction mixture to 100° C., tetrafluoroethylene, in an amount of 59.2 parts, was added in increments to the reaction mixture over a period of 60 hours at 10 to 20 p.s.i.g. After the reaction was completed, the heavier fluorocarbon layer, which measured 49.2 parts, was collected from the side arm of the vessel and fractionally distilled. The fluorocarbon layer was found to have the following composition:

| Compound | Boiling point, ° C./mm. Hg. | Weight percent | Number of isomers measured by vapor phase chromatography |
|---|---|---|---|
| $C_8F_{16}$ | 53/145 | 11 | 2 |
| $C_{10}F_{20}$ | 70/100–50/25 | 47 | 3 |
| $C_{12}F_{24}$ | 40/5 | 23 | 4 |
| $C_{14}F_{28}$ | 48/1.5 | 17.5 | 4 |
| Residue | | 1.5 | |

Evaporation of the solvent layer gave 39 parts of reaction product containing tetrafluoroethylene. Further fractionation of this solvent product gave 10 parts of adduct containing 29.1% fluorine and having a molecular weight of 504.

Example 7

The procedure of Example 1 was repeated using one part cesium fluoride and 10 parts ethyleneglycol dimethyl ether. After replacing the atmosphere in the vessel with tetrafluoroethylene at 5 p.s.i.g. and heating the reaction mass at 80° C. with agitation, 3.5 parts of tetrafluoroethylene were added in increments to the reaction mass over a period of 240 hours at 10 to 20 p.s.i.g. After the reaction ceased, the heavier fluorocarbon layer (one part) was separated from the solvent layer and shown by distillation to have the same relative composition as the product of Example 1.

Example 8

A mixture of 8.5 parts cesium fluoride and 79 parts triethyleneglycol dimethyl ether was placed in a Hastelloy shaker tube under dry conditions. After the atmosphere in the tube was replaced with tetrafluoroethylene, 108.5 parts of tetrafluoroethylene were added in increments to the solvent medium over a period of 8 hours and at 150–200 p.s.i.g. While the tetrafluoroethylene was being added, the shaker tube was under agitation and maintained at a temperature of 100° C. After the reaction ceased, the heavier fluorocarbon layer was separated from the solvent layer. Fractionation of the fluorocarbon layer indicated the following composition:

| Compound | Boiling point, ° C./mm. Hg. | Weight percent | Number of isomers measured by vapor phase chromatography |
|---|---|---|---|
| $C_8F_{16}$ | | 6 | 2 |
| $C_{10}F_{20}$ | 60/75 | 21 | 3 |
| $C_{12}F_{24}$ | 54/2 | 25 | 4 |
| $C_{14}F_{28}$ | 48–40/1.5 | 42 | 4 |
| Residue | | 6 | |

Fractional distillation of the solvent layer gave 13 parts of an adduct of triethyleneglycol dimethyl ether with tetrafluoroethylene having a boiling point of 93–100° C. at 0.2 mm. Hg. The adduct having a molecular weight of 420 contained 42.5% fluorine. The residue, amounting to 21 parts, had a molecular weight of 553 and contained 42.5% fluorine.

Since it is obvious that many changes and modifications can be made in the above-described details without departing from the nature and spirit of the invention, it is to be understood that the invention is not to be limited to said details except as set forth in the appended claims.

The embodiments of the invention in which an exclusive property or privilege is claimed are defined as follows:

1. A process for preparing polymers of tetrafluoroethylene which comprises contacting tetrafluoroethylene with cesium fluoride suspended in a solvent having the structure $RO(C_pH_{2p}O)_nR$, wherein R is a $C_1$ to $C_4$ alkyl group, $p$ is an integer from two to four and $n$ is an integer from one to four, at a pressure from 7 to 225 p.s.i.a. and a temperature of from 0° C. to 200° C., and recovering from the reaction mixture liquid fluorinated products containing from eight to thirty carbon atoms.

2. The process of claim 1 wherein the solvent is diethyleneglycol dimethyl ether.

3. The process of claim 1 wherein the solvent is triethyleneglycol dimethyl ether.

4. The process of claim 1 wherein the solvent is tetraethyleneglycol dimethyl ether.

5. A process for preparing polymers of tetrafluoroethylene which comprises suspending cesium fluoride in a solvent having the structure $RO(C_pH_{2p}O)_nR$, wherein R is a $C_1$ to $C_4$ alkyl group, $p$ is an integer from two to four and $n$ is an integer from one to four, within a closed reaction vessel, thereafter introducing tetrafluoroethylene incrementally into said solvent medium with agitation as to 200° C., until the reaction is substantially complete as indicated by a lack of pressure drop within the closed reaction vessel after the introduction of an incremental amount of tetrafluoroethylene, maintaining the reaction medium at a pressure of from 25 to 40 p.s.i.a. and a temperature of from 70° C. to 125° C. throughout the addition of said tetrafluoroethylene, allowing the reaction mass to settle after cessation of the reaction thereby forming two distinct liquid layers, separating said layers and recovering from the heavier layer liquid fluorinated products containing from eight to thiry carbon atoms.

6. The process of claim 5 wherein the solvent is diethyleneglycol dimethyl ether.

7. The process of claim 5 wherein the solvent is triethyleneglycol dimethyl ether.

8. The process of claim 5 wherein the solvent is tetraethyleneglycol dimethyl ether.

9. The liquid perfluorocarbon products containing from eight to thirty carbon atoms obtained from the process defined in claim 1.

References Cited

UNITED STATES PATENTS 2,918,501  12/1959  Brehm et al. _____ 260—653.3
3,223,739  12/1965  Teumac _____ 260—653.1

DANIEL D. HORWITZ, *Primary Examiner.*